Sept. 19, 1950  R. W. DROBISCH  2,522,753
ELECTRIC BLANKET CONTROL
Filed July 24, 1947  2 Sheets-Sheet 1
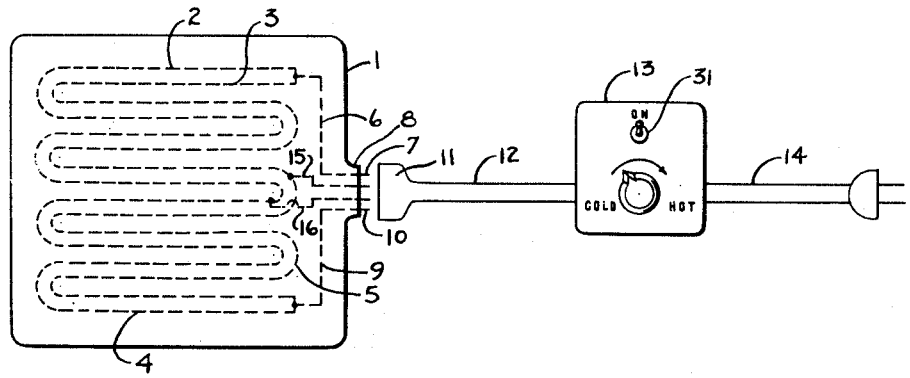
Fig. I
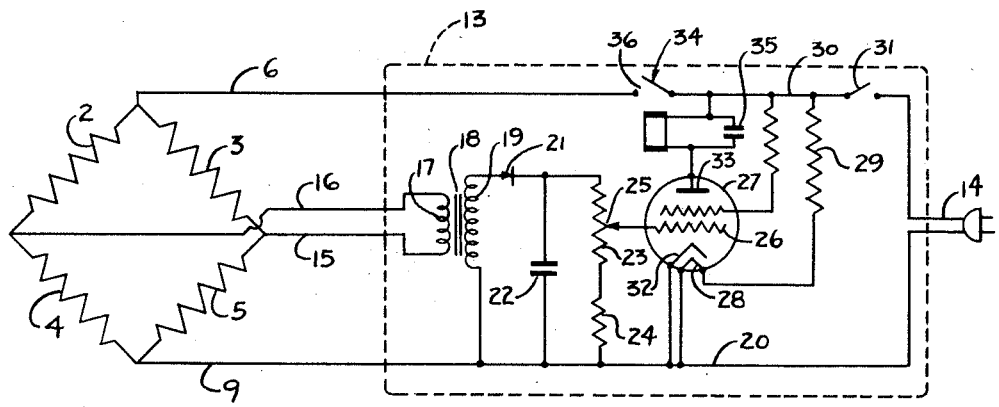
Fig. II
INVENTOR.
RAYMOND W. DROBISCH
BY
Marshall and Marshall
ATTORNEYS Sept. 19, 1950 R. W. DROBISCH 2,522,753
ELECTRIC BLANKET CONTROL
Filed July 24, 1947 2 Sheets-Sheet 2
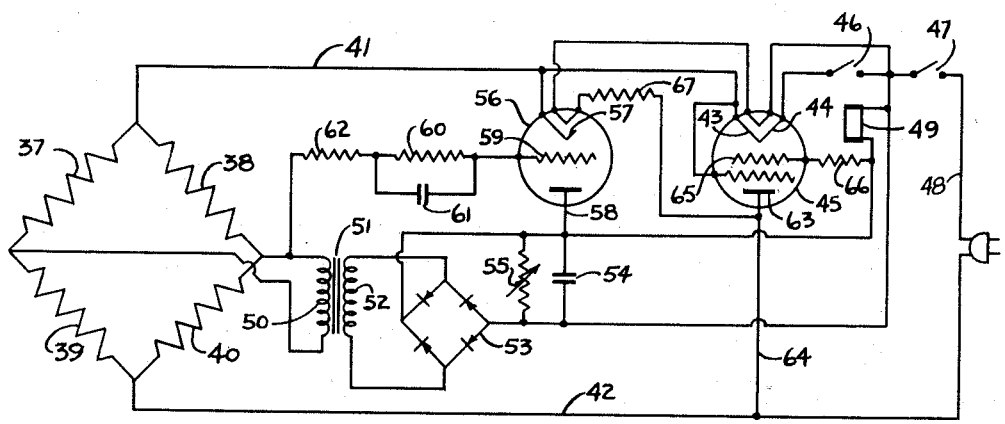
*Fig. III*
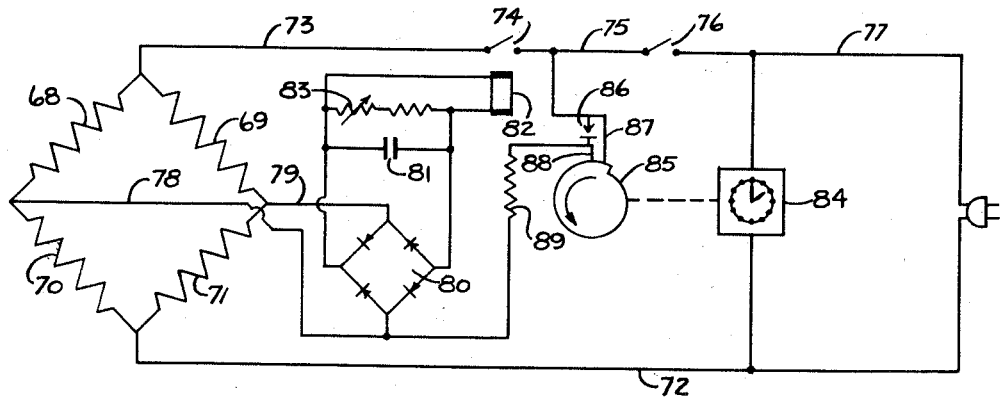
*Fig. IV*
INVENTOR.
RAYMOND W. DROBISCH
BY
Marshall and Marshall
ATTORNEYS Patented Sept. 19, 1950

2,522,753

UNITED STATES PATENT OFFICE 2,522,753

ELECTRIC BLANKET CONTROL

Raymond W. Drobisch, Toledo, Ohio, assignor to The Swartzbaugh Manufacturing Company, Toledo, Ohio, a corporation of Ohio Application July 24, 1947, Serial No. 763,415

1 Claim. (Cl. 219—46)

This invention relates to the control for electrical heating apparatus and in particular to the control of the temperature of electrical heating elements that are placed in blankets.

The number of bed covers required to maintain comfort during cold weather may be materially reduced if electrical heating elements are included in one of the blankets and are energized to supply the heat that is normally lost through the blankets to the atmosphere of the room. Because of the wide variations in temperature that may exist in a bedroom it is necessary that some type of control be included in the electrical circuit so that the amount of heat electrically supplied to the blanket is just sufficient to maintain its temperature. Without such a control, a blanket that is designed for use in an unheated room exposed to severe winter weather supplies too much heat for comfort during mild weather or in a partially heated room. Some electrically heated blankets have been controlled by a thermostatically controlled switch that is mounted in a control box and which is heated by a heated element placed within the control box and subjected to the same electrical current that flows in the blanket heating elements. The control box, and the heater included therein, is designed so that the heat loss and temperature of the control box is about the same as the heat loss and temperature of the blanket. If the balance between the control box and the blanket is properly maintained the blanket temperature will follow very closely that of the control box and, by thermostatically controlling the temperature of the control box, the temperature of the blanket is maintained. This type of control is subject to the disadvantage that if the user places another blanket over the electrically heated blanket without at the same time covering the control box the heat loss from the blanket is reduced without a corresponding reduction in heat loss from the control box and consequently the blanket overheats. It is therefore preferable to control the heat input into the blanket according to the blanket temperature rather than according to the temperature of a control box that is not subjected to the same conditions as the blanket.

The object of this invention is to provide an electrical heating element, for a blanket or other device to be heated to a selected temperature, which heating element generates an electrical signal that is indicative of its temperature and that may be used, at least in part, to control the heat input into the heating element.

Another object of the invention is to provide a control for an electrically heated blanket which control interrupts the flow of power to the heating elements of the blanket for an appreciable time interval after the selected temperature of the elements has been reached.

A still further object of the invention is to provide a control that maintains the flow of power to the heating elements of the blanket until the selected temperature is obtained and then interrupts the flow of power for a predetermined time interval succeeding the attainment of the selected temperature.

More specific objects and advantages are apparent from the following description in which reference is made to the accompanying drawings illustrating the invention.

According to the invention the temperature of the heating element of an electric blanket may be accurately controlled by employing the heating element as one or more of the arms of a Wheatstone bridge the cross potential of which varies according to the temperature of the element. A control circuit sensitive to the cross potential of the bridge is employed to control a power flow to the bridge and to maintain the bridge deenergized for an appreciable time interval following each interruption of power.

Preferred forms of the invention are illustrated in the accompanying drawings.

In the drawings:

Figure I is a schematic diagram showing an electrically heated blanket connected through a control box to a source of power.

Figure II is a schematic diagram of one form of control that may be used with the improved blanket heating element.

Figure III is a schematic diagram of a second form of control suitable for use with the improved blanket heating element.

Figure IV is a schematic diagram of still another form of control circuit suitable for use with the improved heating element.

These specific figures and the accompanying description are intended merely to illustrate the invention but not to impose limitations on the claims.

Referring to Figure I, a blanket 1 or other article to be heated has threaded therein a plurality of electric resistance wire heating elements 2, 3, 4, and 5. The resistance wire elements are distributed throughout the area of the blanket 1 so that a substantially uniform distribution of heat is obtained. The resistance elements 2 and 3 are, at one end, connected together and to a lead 6 that terminates in a pin 7 of a connection plug 8 attached to the blanket. The other end of the resistance element 2 is connected to one end of the resistance element 4 while the resistance element 3 is similarly connected to the resistance element 5. The remaining ends of the elements 4 and 5 are connected together and to a lead 9 that terminates in a pin 10 of the connection block 8. The elements are thus connected in two parallel circuits with two elements in each circuit. The connection pins 7 and 10 engage cooperating contacts of a socket 11 connected to the end of a multi-conductor cord 12 that leads to a control box 13. Electrical power is transmitted to the control box 13 through a plug and cord 14 and, when the blanket is to be heated, the power is transmitted through the cord 12 to the leads 6 and 9 in the blanket and thus to the resistance elements.

The junctions between the elements 2 and 4 and the elements 3 and 5 are connected through leads 15 and 16 and corresponding pins in the plug 8 to the multi-conductor cord 12 and thus to the control box 13.

Referring to Figure II, it will be noticed that the elements 2, 3, 4, and 5 of the blanket are connected as a bridge circuit with the elements 2 and 5 in opposite arms and the elements 3 and 4 in opposite arms. The resistance elements 2 and 5 may be made of a resistance material having a high temperature coefficient of resistance as for example an alloy of cadmium and bronze while the resistance elements 3 and 4 are made of a resistance material having a comparatively small temperature coefficient of resistance such as the alloy sometimes known as "constantan." In the circuit as shown in Figure II the elements 2, 3, 4, and 5 are adjusted as to resistance so that the bridge balances with no potential between the leads 15 and 16 when the temperature of the heating elements is in the order of 25° to 40° F. As the temperature of the heating elements rises due to the flow of current through the elements a cross potential appears between the leads 15 and 16 which potential is applied to the primary winding 17 of a step-up transformer 18.

The transformer 18 has one end of its secondary winding 19 connected to a lead 20 that is connected to one side of the power cord 14 and through the multi-conductor cord 12 to the blanket lead 9. The other side of the secondary winding 19 is connected through a half-wave rectifier 21 to the parallel combination of a condenser 22 and series connected resistors 23 and 24. The condenser 22 as charged by current flow through the rectifier 21 to a potential that varies according to the temperature of the heating elements of the blanket as indicated by the cross potential voltage of the bridge applied to the transformer 18.

An adjustable connection 25 of the resistor 23 is connected to a control grid 26 of a thermionic tube 27. The thermionic tube 27 has a filament 28 that is connected in series with a current limiting resistor 29 between the lead 20 and the other side of the power line by way of a lead 30 and a control switch 31. The tube 27 has its cathode 32 connected to the lead 20 and its plate 33 connected through the coil of a relay 34 to the power lead 30. A condenser 35 connected in parallel with the coil of the relay 34 prevents the relay from vibrating in response to the pulses of current flowing through the tube 27.

When power is first applied to the control circuit by closing the switch 31 the relay 34 being deenergized has its contacts 37 open so that the heating elements of the blanket are not energized. Current however flows through the filament of the thermionic tube 27 which tube as soon as its cathode reaches operating temperature draws sufficient plate current through the coil of the relay 34 to close its contacts 36. Closure of the contacts 36 permits current to flow to the heating elements of the blanket and, depending upon the temperature of the blanket, causes a potential to appear between the leads 15 and 16 connected to the primary of the transformer 18. If the blanket is cold there is little voltage applied to the transformer 18 and consequently the condenser 22 is not charged or is charged to a very small extent so that there is insufficient grid bias applied to the thermionic tube 27 to prevent current flow through the tube. The tube 27 therefore continues to draw plate current and to hold the relay 34 closed. As the heating elements of the blanket rise in temperature the cross potential of the bridge increases so that more voltage is applied to the transformer 18 and the condenser 22 is charged to a higher potential. This condition continues until sufficient voltage appears across the condenser 22 and the resistors 23 and 24 to bias the tube 27 to plate current cut-off whereupon the relay 34 is deenergized and the heating elements disconnected. The opening of the relay contacts 36, by interrupting the flow of current in the heating elements of the bridge, interrupts the voltage supplied to the transformer 18. If it were not for the charged condenser 22 the thermionic tube 27 would immediately draw plate current to reclose the relay. However the charge accumulated on the condenser 22 maintains sufficient negative voltage at the grid 26 of the tube 27 to prevent an immediate increase in the flow of plate current. The discharging of the condenser, during the time that the relay 34 is deenergized, through the resistors 23 and 24 slowly decreases the grid bias applied to the tube 27 until eventually plate current of the tube 27 becomes sufficient to reclose the relay 34.

If the blanket has cooled appreciably during the time interval that the relay 34 was open there will not be sufficient voltage applied to the transformer 18 to immediately reduce the plate current of the tube 27. However, if the blanket has not cooled appreciably during this time interval the current flow established by the reclosure of the relay contacts 36 combined with the unbalance of the bridge circuit applies sufficient voltage to the transformer 18 to immediately recharge the condenser 22 and, through the negative voltage thus applied to the grid 26, interrupt the plate current flow through the tube 27.

In normal operation the plate current of the tube 27 decreases as the blanket warms up until the "drop-out" current of the relay 34 is reached and then it increases until the "pick-up" current of the relay is reached. The decrease in plate current and the approach to the "drop-out" current for the relay 34 is governed by the temperature of the heating elements in the blanket while the increase in plate current is governed by the discharge of the condenser 22 through the resistors 23 and 24.

The blanket 1 has been shown with the four arms of the bridge circuit included as heating elements in the blanket. This is the most economical arrangement as far as complete utilization of the electrical power is concerned because practically all of the heat dissipated by the control is dissipated in the blanket itself. The operation of the circuit however does not depend upon having all four arms of the bridge circuit contained within the blanket but substantially equivalent results may be obtained by placing one arm of the bridge circuit, which arm is made of a material having a high temperature coefficient of resistance, in the blanket and placing the remaining arms of the bridge circuit in the control box. In this arrangement the remaining arms of the bridge circuit should be made of a material having a very low temperature coefficient of resistance or of such coefficient of resistance that the temperature of the control box does not influence the electrical balance of the bridge circuit.

The heating element for the blanket and the control thus consists of an electrical bridge circuit at least one arm of which consists of a resistance wire located in the space to be heated and a control circuit responsive to the cross potential of the bridge circuit for controlling the flow of power to such bridge circuit. The control offers the added feature that immediate recycling of the relay is prevented by a time delay provided by the control circuit. In this circuit the control is actuated upon an increase in signal from the bridge circuit.

The action of the elements of a control may be reversed or other controls may be used if it is considered desirable to operate on a decrease in signal. In this event the bridge elements are balanced to produce a zero cross potential when the temperature of the elements is in the neighborhood of 110° to 160° F.

A circuit suitable for operation on a decrease in signal is illustrated in Figure III. In this arrangement a blanket having heating elements 37, 38, 39, and 40 arranged as a bridge circuit is shown connected between leads 41 and 42. The lead 42 is connected directly to a source of power while the lead 41 after passing through a pair of cathode connections 43 and 44 of a gas tetrode tube 45 is connected through relay contacts 46 and a switch 47 to a lead 48 connected to the other side of the source of power. The relay contacts 46 are operated by a relay coil 49. Assuming that the contacts 46 are closed, current flows through the bridge elements and the cross potential of the bridge is supplied to a primary winding 50 of a step-up transformer 51 that has its secondary winding 52 connected to a full-wave bridge rectifier 53. The D. C. output of the bridge-rectifier 53 is applied to the parallel combination of a condenser 54, the relay coil 49, and an adjustable resistor 55.

As long as there is an appreciable unbalance between the arms of the resistance wire bridge circuit in the blanket sufficient voltage is applied through the transformer 51 and the bridge rectifier 53 to keep the relay coil 49 energized to hold the relay contacts 46 closed. As the temperature of the blanket rises the cross potential of the bridge circuit decreases and the current in the relay coil 49 decreases accordingly until finally the relay opens its contacts 46 thereby interrupting the flow of current to the heating elements.

Since the relay contacts 46 are normally open the temperature control portion of this circuit can never initiate a cycle of operation because when the relay is open there is no voltage applied to the bridge circuit and therefore no unbalance voltage to energize the relay coil 49. This condition is overcome and a cycle of operation is initiated by a thermionic tube 56 that has its cathode 57 connected to the lead 41 and that has its plate 58 connected to the negative side of the bridge rectifier 53 and condenser 54. When the relay contacts 46 are open the thermionic tube 56 is, in effect, connected with the relay coil 49 in its plate circuit and with the resistance wire bridge circuit comprising the heating elements 37, 38, 39, and 40 in its cathode circuit. Current flow through the relay coil 49 and the thermionic tube 56 depends upon the grid bias of the thermionic tube 56. (It is understood that in these circuits with alternating current applied to the plate circuit that current flows through the tubes only during those half cycles of the alternating current during which the plate of the tube is positive with respect to its cathode.)

The tube 56 has its grid 59 connected through a grid leak 60 and condenser 61 and a current limiting resistor 62 to one side of the primary 50 of the transformer 51. Since the resistance of the resistance wire elements is low compared to the resistance of the other resistors in the control circuit, the flow of plate current of the tube 56 through the resistance wire elements of the blanket does not produce sufficient cathode bias to limit current flow through the tube. Therefore when the apparatus is first turned on by closing the switch 47 and the cathode 57 of the tube 56 reaches operating temperature current flows from the switch 47 through the relay coil 49 and the tube 56 in an amount sufficient to close the relay contacts 46. The condenser 54 prevents any chattering of the relay contacts 46. If the blanket is cold when the contacts 46 close a cross potential voltage appears across the primary of the transformer 51 which when rectified by the bridge-rectifier 53 provides sufficient current to maintain the relay coil 49 energized. Plate current through the tube 56 is cut off as soon as the relay contacts 46 close because the cathode 57 of the tube is then connected directly to the other—the positive—terminal of the relay 49.

During the half cycles of the alternating current when the lead 41 is negative current flows through the resistors 62 and 60 and the grid-cathode path of the tube 56 to charge the condenser 61 to the peak voltage appearing across the resistance wire element 38. After the blanket warms up sufficiently to reduce the voltage applied to the transformer 51 and thus the current flow in the relay 49, the relay contacts 46 open. The charge accumulated on the condenser 61 holds the grid 59 of the tube 56 sufficiently negative with respect to the cathode 57 so that no current can flow through the tube 56 to immediately reclose the contacts 46. The condenser 61 slowly discharges through the resistor 60 until the grid bias on the tube 56 is reduced to the point that plate current can again flow to reclose the relay contacts 46. The discharge of the condenser 61 thus provides a time delay during which the power is cut off from the blanket and prevents the rapid chattering of the relay which would result if no time delay were employed.

In this circuit the adjustment of the resistor 55 by changing the load applied to the bridge rectifier 53 changes the amount of unbalance required to maintain the relay energized and thus affords a control for setting the operating temperature of the blanket. This control is thus similar to the adjustment of the resistor 23 of the circuit shown in Figure II and in each arrangement an operating knob is provided on the front of the control box 13 to permit adjustment of the blanket temperature as may be required.

In this circuit, as in the preceding circuit, the resistance elements constituting the heating elements in the blanket form at least one of the arms of a bridge circuit the cross potential of which is used as a signal to control the flow of power to the resistance heating elements. Means also provide a time delay during which the flow of power to the blanket is interrupted following the attainment of the selected temperature in the blanket.

The gas tetrode 45 provides protection against sticking of the relay contacts 46 and consequent loss of control and overheating of the blanket. The gas tetrode 45 has its plate 63 connected through a lead 64 to the return lead 42. A control grid 65 of the gas tetrode 45 is connected through a high resistance 66 to the negative end of the relay coil 49. The voltage drop across the relay coil 49 during normal operation and including the condition when the contacts are ready to open is sufficient to prevent breakdown of the plate-cathode path of the gas tetrode 45 and therefore the tube is inactive. If it should happen that the relay contacts 46 do not open as the current through the relay coil 49 decreases the blanket temperature continues to rise and the current flow through the coil 49 decreases until there is insufficient voltage drop across the relay coil to prevent plate current conduction through the gas tetrode 45. Because the flow of current in a gas tube is limited only by the impedance of the circuit connected in series with the tube the breakdown of the plate cathode path of the gas tetrode 45 results in an excessive current flow from the contact 46 through the cathode connection 44, through the tube 45 and the lead 64 to the return lead 42. This excessive current flow melts the cathode connection 44 and in so doing cuts off the flow of current to the heating elements in the blanket.

The filaments for the thermionic tube 56 and the gas tetrode 45 are connected in series and in series with a current limiting resistor 67 are connected between the switch 47 and the return lead 42.

Another control circuit employing the same principles of operation as the preceding circuits is illustrated schematically in Figure IV. In this circuit resistance wire elements 68, 69, 70, and 71, at least one of which is included in the space to be heated, are connected in a bridge circuit one corner of which is connected through a lead 72 to one side of a source of electrical power. The opposite corner of the bridge circuit is connected through a lead 73, a set of relay contacts 74, a lead 75, and a switch 76 to a lead 77 connected to the other side of the source of electrical power. The resistance wire heating elements 68, 69, 70, and 71 are made two of each of two resistance materials having different temperature coefficients of resistance so that the cross potential of the bridge circuit applied to leads 78 and 79 varies according to the temperature of the resistance wire elements. The resistance wire elements are selected and connected so that they balance electrically at a temperature above the desired operating temperature of the elements. Assuming the circuit to be in operation with the switch 76 closed, the relay contacts 74 closed and the blanket or heating elements cold, the cross potential of the bridge circuit is transmitted through the leads 78 and 79 to a full-wave bridge-rectifier 80 the direct current output of which is filtered by a condenser 81 and is applied to a relay coil 82 that operates the contacts 74. An adjustable resistor 83 connected in parallel with the relay coil 82 serves to by-pass some of the rectified current from the relay coil 82 and thus serves to adjust the drop-out of the relay contacts 74 with respect to the temperature of the heating elements as indicated by the cross potential of the resistance wire bridge circuit.

As the resistance wire elements become warm the cross potential decreases and finally becomes so small that the relay coil 82 releases the contacts 74 and they separate to interrupt the flow of electrical power to the resistance wire elements. Interrupting the flow of power permits the blanket to cool and without auxiliary equipment the relay would never reclose because as long as the contacts 74 are open there is no potential applied to the bridge rectifier 80 to provide current for the relay coil.

In addition to the bridge rectifier 80 and the relay, the control for this circuit includes an electric clock 84 that is permanently connected between the power leads 72 and 77 and that mechanically drives a cam 85 at a rate of approximately one revolution per minute. The cam 85 controls a pair of contacts 86 having fingers 87 and 88 riding on the periphery of the cam 85 and arranged to successively drop when the offset of the cam 85 passes beneath them. Thus in the combination shown the finger 87 drops first to permit the contacts to close and then a moment later the finger 88 drops to separate the contacts and the contacts then remain separated for the remainder of the cam revolution during which both fingers are returned to their original position. The contacts 86, when closed, complete a circuit from the lead 75 through a resistance 89 to the lead 78 connected to one side of the bridge rectifier 80 and the junction between the resistance wire elements 68 and 70. From the lead 78 the current follows either of two paths in returning to the return lead 72. The first of these paths includes the resistance wire element 70 while the second of these paths includes the resistance wire elements 68, 69, and 71. Because of the difference in resistance of these parallel paths the voltage drop across the resistance wire element 71 is only one-third as much as the voltage drop across the resistance wire element 70 and the difference in these voltage drops is applied to the bridge rectifier 80 to provide current flow in the relay coil 82 sufficient to close the relay contacts 74. The contacts 74 remain closed as long as the cam actuated contacts 86 are closed and longer only if the resistance wire heating elements are below the selected temperature. As soon as the cam actuated contacts 86 open the current in the relay coil 82 depends entirely upon the electrical balance of the resistance wire bridge circuit and therefore upon the temperature of that circuit.

In this circuit a current pulse is provided once each minute to close the relay contacts 74 and a temperature controlled holding circuit maintains the contacts 74 closed until the resistance wire heating elements reach their selected temperature. After such temperature is attained the relay contacts 74 are closed momentarily once each minute and remain closed for sufficient time to supply the heat lost during the off period of the preceding cycle of operation. If the heating element is for any reason warmer than the selected temperature the current supplied to the relay coil 82 by the cross potential of the bridge circuit will be insufficient to maintain the relay contacts 74 closed and they will then open and close synchronously with the cam actuated contacts 86.

This circuit, in common with the preceding circuits, includes a resistance wire heating element that constitutes at least one arm (in the figure all the arms) of a bridge circuit the cross potential of which varies according to the temperature of the resistance wire element, combined with means for deenergizing the bridge circuit when a selected temperature is obtained and means for re-energizing the bridge circuit after an appreciable time interval. The circuit shown in Figure IV differs from that shown in Figure III in that the clock controlled circuit of Figure IV has a complete cycle of operation for each revolution of the cam and therefore completes a complete cycle of heating and cooling in a predetermined time interval while the circuit shown in Figure III provides a fixed time interval during which the heating elements are disconnected from the line following each heating interval regardless of the duration of the heating interval which is determined entirely by the time required to bring the heating elements to the selected temperature.

Various protective devices may be included in the circuit shown in Figures II and IV to provide the same type of protection against sticky relay contact elements or other possible failures in the control mechanism similar to the protection afforded by the gas tetrode tube 45 shown in Figure III. It will be noticed that the circuits shown in Figures III and IV turn the relay off as the temperature indicating voltage decreases and therefore any break in the control circuit gives the relay a "hot blanket" signal so that the relay immediately opens after the closing impulse. The circuit shown in Figure II depends upon the continued continuity of the control circuit to prevent overheating of the heating elements. Failure of any of the electronic tubes used in the circuits leaves the relay contacts open so that there is no resulting overheating of the heating element.

Various modifications in the control circuits may be made without departing from the use of a heating element that constitutes at least one arm of a temperature sensitive electrical bridge circuit and of controlling the flow of power to such heating element according to the electrical unbalance of such bridge circuit.

Having described the invention, I claim:

A control for an electric blanket having a heating winding with a high temperature coefficient of resistance comprising, in combination therewith, a resistor in series with said winding whereby the potential drop across said resistor varies in accordance with current flow through said winding, a resistance bridge network having said winding in one leg, and said series resistor in an adjacent leg, resistors in the other two legs of said bridge, means applying a potential to said bridge, and across said heating winding and first resistance in series, a transformer having primary and secondary windings, said primary being connected across said series resistor and an adjacent resistor of said bridge, an electron tube circuit having its input connected across said secondary winding and a relay in the output thereof, said relay having contacts in circuit with said heating winding and being adapted to be operated by a change in the output current to disconnect said heating winding from a supply source and means operable at the beginning of each heating interval to close said contacts.

RAYMOND W. DROBISCH.

REFERENCES CITED

The following references are of record in the file of this patent:

UNITED STATES PATENTS

| Number | Name | Date |
|---|---|---|
| 915,974 | Leonard | Mar. 23, 1909 |
| 1,183,814 | Haagn | May 16, 1916 |
| 1,276,589 | Steinmetz | Aug. 20, 1918 |
| 1,861,288 | Weill | May 31, 1932 |
| 2,126,398 | Knowles | Aug. 9, 1938 |
| 2,429,453 | Crowley | Oct. 21, 1947 |

FOREIGN PATENTS

| Number | Country | Date |
|---|---|---|
| 144,669 | Great Britain | Sept. 9, 1921 |
| 338,880 | Great Britain | Nov. 18, 1930 |